United States Patent Office.

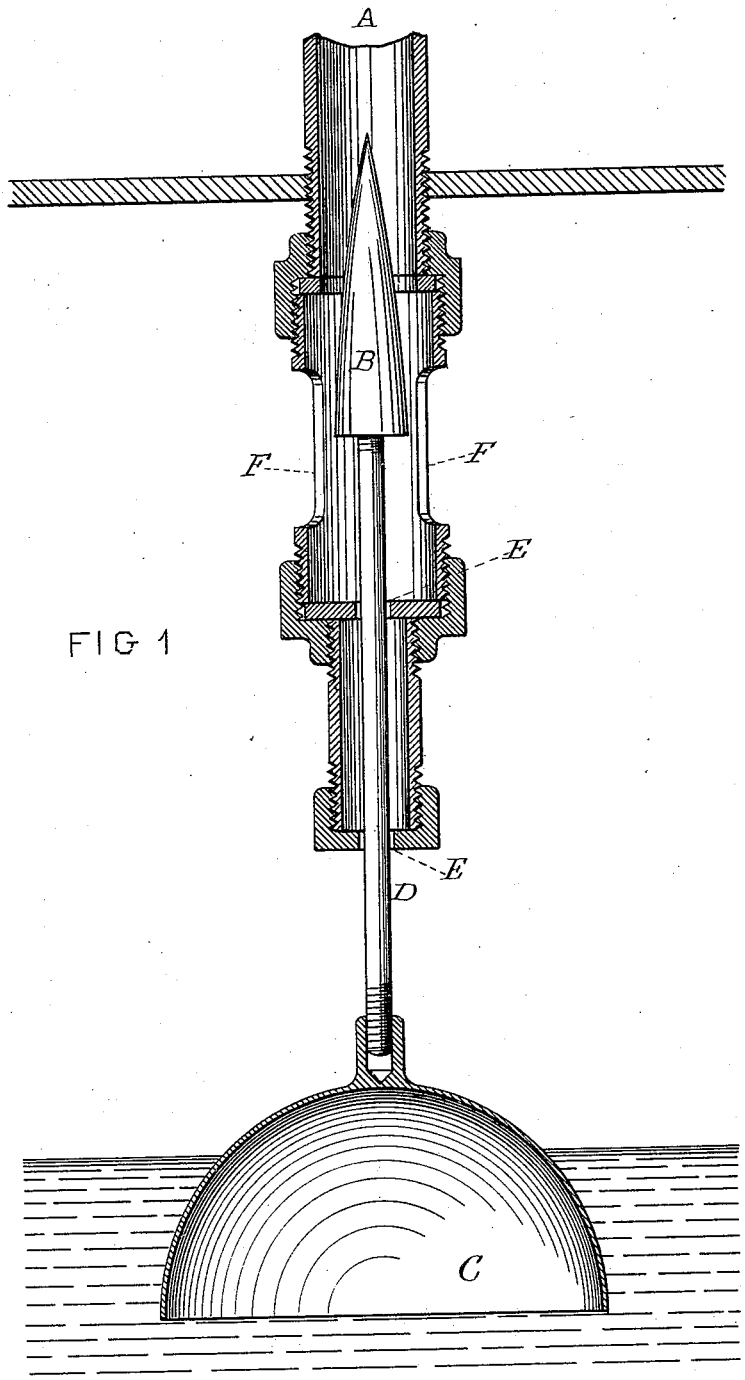

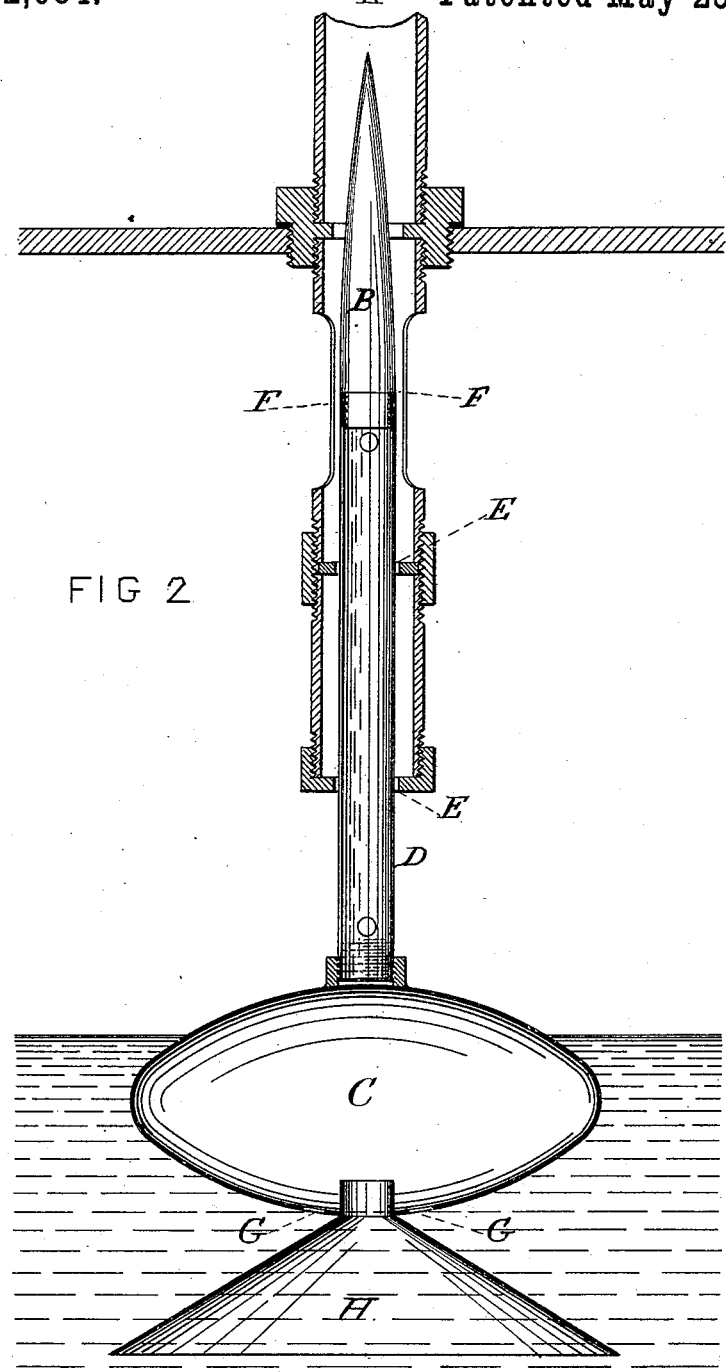

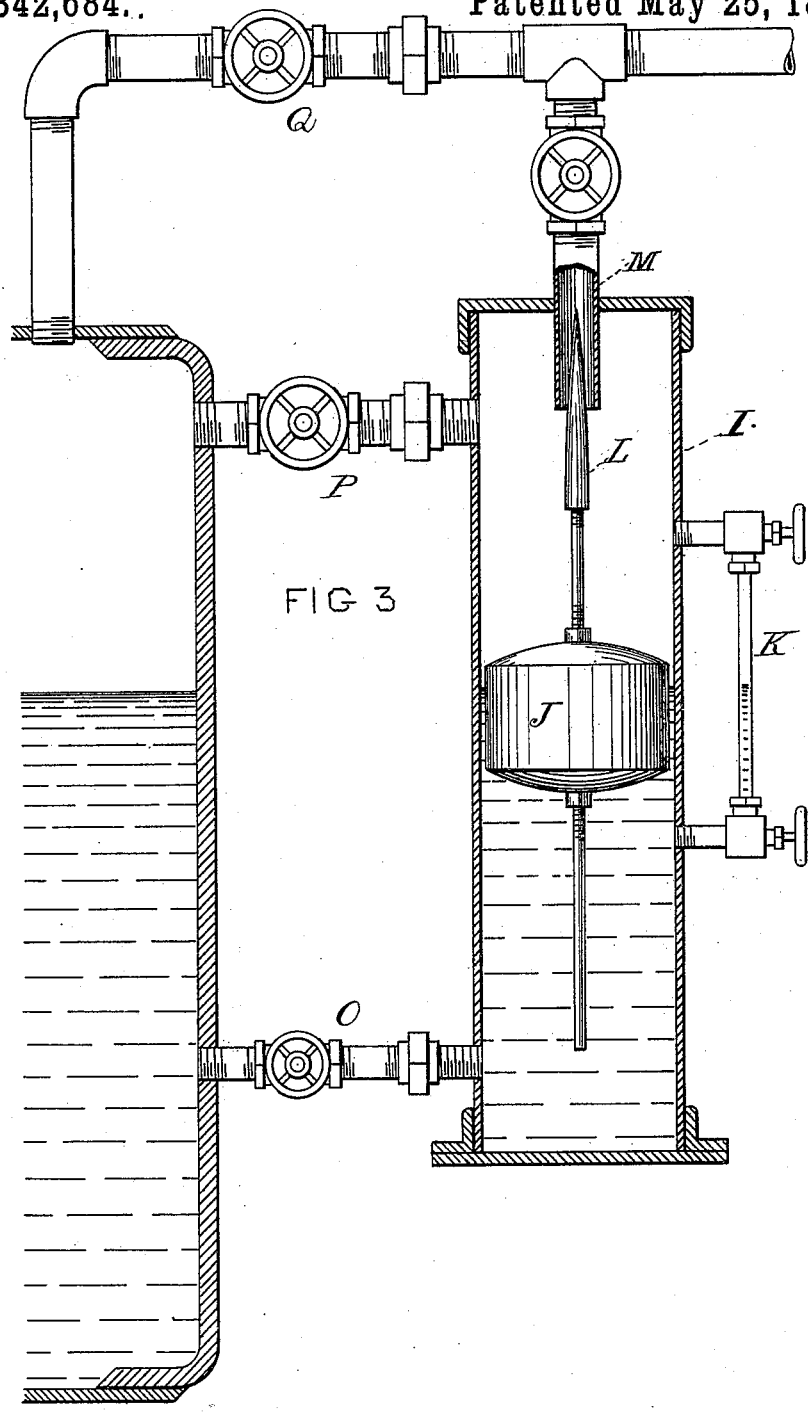

FREDERIC COOK AND BURCHARD THOENS, OF NEW ORLEANS, LOUISIANA; SAID THOENS ASSIGNOR TO SAID COOK.

FEED-WATER REGULATOR.

SPECIFICATION forming part of Letters Patent No. 342,684, dated May 25, 1886.

Application filed September 15, 1885. Serial No. 177,170. (No model.)

*To all whom it may concern:*

Be it known that we, FREDERIC COOK, a citizen of the United States, and BURCHARD THOENS, a citizen of the Empire of Germany, both residing at New Orleans, in the parish of Orleans and State of Louisiana, have invented a new and useful Improvement in Feed-Water Regulators for Steam-Boilers, of which the following is a specification.

The object of our invention is to produce a regulator for graduating the supply of feed-water to steam-boilers, so that the height of the water-level in the boiler regulates the speed of the steam-pump that forces the water into the boiler, or it may also be used for regulating amount of water supplied by an injector.

Various devices have been patented in which floats have worked valves provided with valve-seats, which valves, when the water rises, entirely close the steam-opening leading to steam-pump and stop the pump, which, if a fly-wheel pump, has to be started again by hand, and valves having seats when worked by floats have not been found to work satisfactorily from sticking, and hence have not come into general use. Floats have been used containing air, and it has been found that air-floats being subject to the boiler-pressure finally water is forced through either the joints or the pores of the metal, so that the efficiency of the float becomes gradually destroyed and the valves cease to act with accuracy, and finally the float becomes so heavy that it sinks in the water and ceases to be buoyant. We have produced a complete regulator that overcomes these objections. We dispense with the usual well-known valve and seat, and use at the end of the float-stem a conical-shaped top that requires no seat, the largest diameter of the cone being smaller than the inside diameter of the end of the steam-pipe opening where steam enters to run the steam pump or injector, so that as the water falls the cone sinks and more steam is admitted to steam-pipe, and when the cone rises the steam is reduced and the steam-pump slows until the largest diameter of the cone enters the end of the steam-pipe, when the supply becomes constant, (until water falls again,) as only a ring of steam is admitted, just enough to prevent the pump entirely stopping. We also use a float filled with cork or other light material lighter than water and that will not be injured by the heat of the boiler and incase the filling with metal; or we dispense with any solid filling and use a float made buoyant by steam inside, and not under pressure, like air-filled floats, which have been found so objectionable. We attained these objects by the mechanism shown in the accompanying drawings, in which—

Figure 1 shows a section of a complete regulator applied inside a steam-boiler with a steam-float of a hemispherical shape. Fig. 2 shows a section of a complete regulator, also inside a steam-boiler, but arranged to take out the casing from outside, draw up the float-stem, and clean it from deposit; also, a float is shown with a funnel below for gathering steam. Fig. 3 is a sectional view of our regulator with a cork-filled float applied to a water-column outside a steam-boiler.

In Figs. 1 and 2, A is the steam-pipe leading to steam pump or injector. B is our conical regulating obstructor. C is the steam-float; D, the float-stem. The stem D works up and down through holes E in a casing, as shown. At F are holes in casing to admit steam. The conical regulating obstructor B cannot rise or fall beyond a certain point, as it is arranged to come to a stop either way on the casing at high and low water mark. All parts are balanced by the steam-pressure, and the flow of steam never entirely stops, but is graduated according to the condition of the water-level in boiler.

The float C is made buoyant by steam entering it inside. It is open at the bottom, as shown at Figs. 1 and 2, and as the steam rises into it, that is generated from the portion of the boiler directly under it, the steam so entering the float cannot escape until it has displaced the water, fills the float with steam, and then escapes either around the edges of float, as at Fig. 1, or through holes G, as at Fig. 2. The float becomes buoyant and acts like any other float. We do not confine ourselves to the special shapes of steam-floats shown, as they may be of any shape that will allow steam to enter them, displace the water, and permit the condensed water, if any is formed, to escape.

The arrangement of our regulator may be changed from direct action, as shown and described, to any system of levers working on a fulcrum, and our conical obstructor applied to work from any part of lever receiving motion from a float.

Our steam-floats can be used for any purpose requiring a float resting on the water-level of a steam-generator.

Fig. 3 shows the application of our regulator to a water and steam column outside a steam-boiler. I is a water-column. J is a float filled with cork. K is a water-gage; L, the conical obstructor; M, the steam-pipe leading to steam-pump; N, the end of a steam-boiler; O, the water-connection; P, the steam-connection; Q, a by-pass to supply steam direct to pump if the regulator has to be shut off for any cause. The float J is filled with cork or other material lighter than water, and has a metallic casing, with a float so constructed should the casing leak the buoyancy of the float will be affected very little, and if it should thereby become slightly heavier the water-level would only rise a little higher, when the regulator would work as before.

It is obvious that our conical regulating obstructor is superior to any valve which shuts onto a seat, as the valve is liable to stick or to remain closed by the steam-pressure, unless very perfectly balanced, which makes complication; but as our conical obstructor has no seat it can never stick or get out of order.

We claim as new—

1. In a feed-water regulator, an obstructor deriving its motion from a float and working in an open-ended steam-pipe without any valve-seat, and so arranged as to never entirely shut off the flow of steam to steam pump or injector, so that the water-supply for a steam-boiler may be regulated, substantially as described.

2. In a feed-water regulator, a float combined with a conical-shaped obstructor, whose largest diameter is smaller than the inside diameter of the opening in steam-pipe in which it works, and self-adjustable by means of the water-level, should the float become more deeply immersed from variation of its specific gravity, substantially as described.

3. The combination of a regulating conical obstructor, B, and open-ended steam-pipe A, and a float made buoyant by steam inside, substantially as described.

4. In a feed-water regulator, a float filled with cork or other solid matter lighter than water and incased in metal, substantially as described.

5. The combination of the herein-described regulating cone working in an open-ended steam-pipe with a steam-float having a chamber from which the water of condensation formed inside the float will flow back into the boiler, substantially as described.

FREDERIC COOK.
BURCHARD THOENS.

Witnesses:
EDWARD J. BLANCHARD,
J. MILTIMORE.